Figure 2:
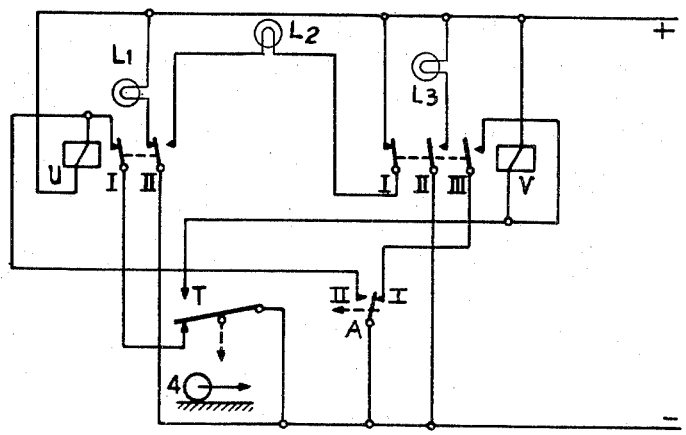

May 3, 1955        P. SCHAURTE        2,707,333
ELECTRICAL COMPARATOR
Filed May 5, 1950        3 Sheets-Sheet 1
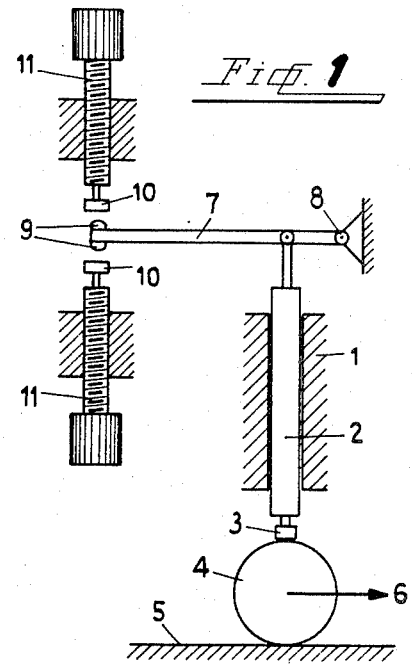
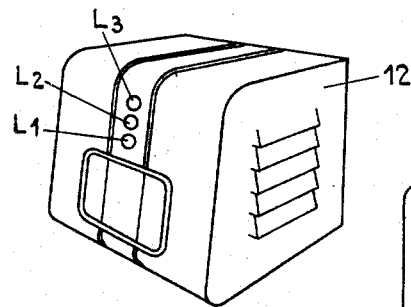
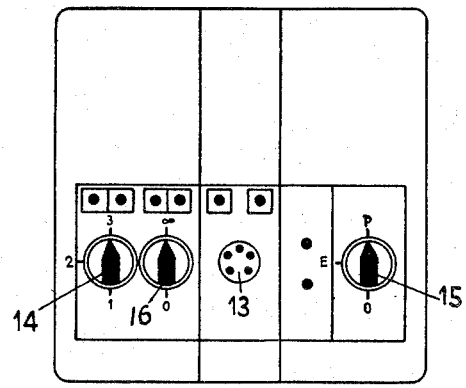
INVENTOR:
PAUL SCHAURTE May 3, 1955  P. SCHAURTE  2,707,333
ELECTRICAL COMPARATOR
Filed May 5, 1950   3 Sheets-Sheet 2

INVENTOR:
PAUL SCHAURTE
BY

May 3, 1955  P. SCHAURTE  2,707,333
ELECTRICAL COMPARATOR
Filed May 5, 1950  3 Sheets-Sheet 3
*Fig.* 4
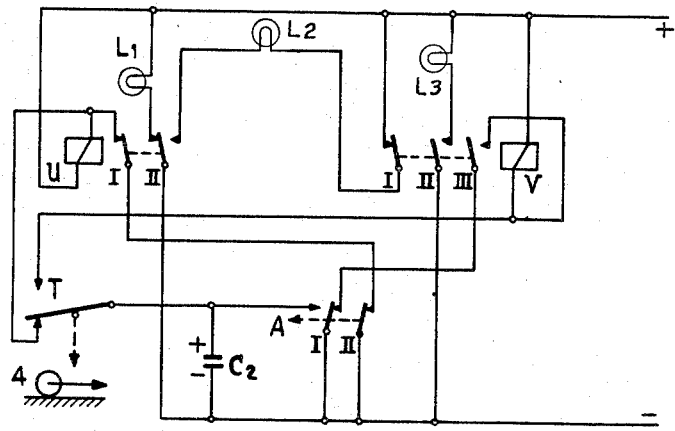
*Fig.* 5
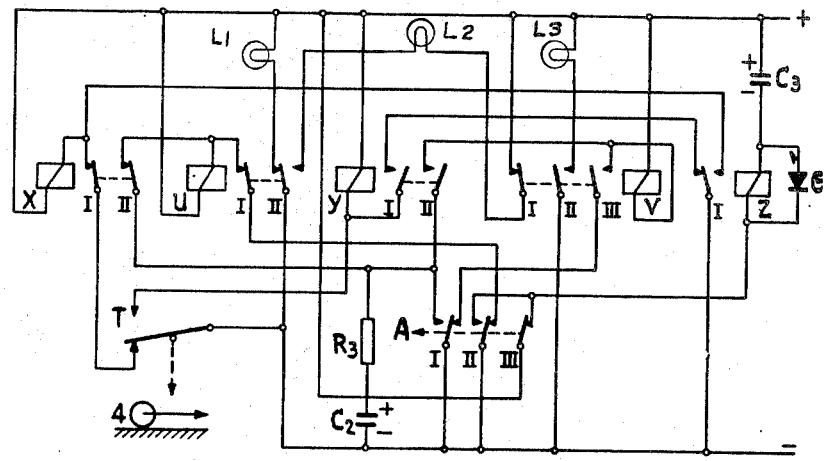
INVENTOR:
PAUL SCHAURTE
BY *Leon M. Straus*
AGT.

United States Patent Office 2,707,333
Patented May 3, 1955

2,707,333

ELECTRICAL COMPARATOR

Paul Schaurte, Vaduz, Liechtenstein

Application May 5, 1950, Serial No. 160,195

Claims priority, application Switzerland May 6, 1949

1 Claim. (Cl. 33—147)

The present invention relates to an apparatus for determining permissible allowances of work pieces.

For gauging geometrical measurements and tolerances of work pieces etc., comparators or limit gauges in which the result of gauging and measuring respectively becomes directly visible during the gauging operation have been used hitherto, but the result becomes lost immediately upon removal of the work from the gauge if the tester has not retained the result in his memory or written it down. The gauging of mass-produced goods therefore demands considerable skill from the operator since with each gauging operation great care has always to be taken that the gauging result obtained actually corresponds with the dimension for which the work has been gauged, that by way of example with circular shafts actually the dimension of the diameter was gauged and noted down and not that of a chord.

To obviate the foregoing difficulties, according to this invention the gauging result is retained after conclusion of the gauging operation.

The apparatus according to the present invention for carrying out the method is characterized by means which retain the gauging result after conclusion of the gauging operation.

Figure 3:
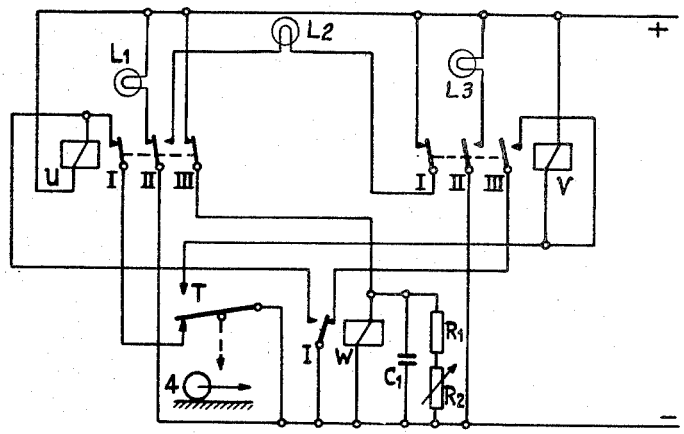

By way of example several embodiments of the present invention are diagrammatically illustrated in the drawings accompanying and forming part of this specification in which:

Fig. 1 is the diagrammatical construction of a comparator in longitudinal section which operates electric contacts, Figs. 2 to 5 illustrate circuits to be influenced by the comparator for making the gauging result visible, according to Figs. 2 and 3, said gauging result remaining visible for a certain time after the gauging operation and according to Figs. 4 and 5 becoming visible only after the lapse of a certain time, Fig. 6 is a perspective representation of an indicating apparatus for the gauging result in which apparatus one of the current circuits shown in Figs. 2 to 5 is installed, and Fig. 7 illustrates the indicating apparatus viewed from the rear.

For carrying out the gauging method according to this invention a comparator with a gauging pin and with electric contacts cooperating with said gauging pin are required in addition to the apparatus of the present invention. Such a comparator which in general can be assumed as being known, is illustrated diagrammatically in Fig. 1. In a vertical gauge 1 there is a gauging pin 2 mounted for displacement in the axial direction, said gauging pin being permanently urged downwardly by its own weight or by a spring (not shown). Its lower end is provided with a suitable gauging element 3 which contacts a test piece 4 such as a cylindrical shaft along its skirting surfaces on its being moved past on a fixed base 5 in the direction of the arrow 6. The top end of the gauging pin 2 is movably connected to a contact lever 7, said contact lever being pivotally mounted an a fulcrum at 8.

The free end of the contact lever 7 carries an upwardly directed and a downwardly directed contact element 9, each of said contact elements being stationarily, but adjustably located opposite a contact surface 10. These contact surfaces are each adapted for displacement in a vertical direction by means of a threaded spindle 11 and are electrically insulated from each other and from the contact lever 7 by suitable means. For the gauging of work pieces 4 the contact surfaces 10 are adjusted in such a manner that the contact element 9 of the contact lever 7 remains resting on the bottom contact surface 10 if the test piece is too small, i. e. is of "undersize," but that however with too large a test piece, i. e. one of "oversize" the contact element 9 of the lever 7 comes to lie against the top contact surface 10. With all test pieces, the dimensions of which are within the permissible limits, the contact elements will be between the two contact surfaces 10 as the test piece is passed through and will not make contact at the top nor at the bottom.

According to Fig. 2 the comparator T is connected to a circuit having two electromagnetic or electroresponsive relays U and V in such a manner that the contact lever is connected to the negative terminal of a current source. The bottom contact surface is connected through the operating contact I of the relay U to one end of the winding of the relay U. The top contact surface is connected to one end of the winding of the relay V as well as to the operating contact III of the relay V. The other ends of the windings of the two relays are connected to the positive terminal of the current source. An indicating lamp $L_1$ is connected in series with an operating contact $U_{II}$, i. e. the contact II of the relay U between the two terminals of the current source as well as a lamp $L_3$ in series with an operating contact $V_{II}$ of the relay V. A further indicating lamp $L_2$ is connected to the current source through the operating contact $U_{II}$ and the operating contact $V_I$. A selectively actuable change-over switch A, which by way of example can be operated by means of a hand or pedal key, has a rest contact $A_I$ connected between the negative terminal of the current source and the operating contact $V_{III}$, whereas an operating contact $A_{II}$ is arranged between the negative terminal of the current source and the end of the winding of the relay U connected to the contact $U_I$.

The method of operation of the arrangement of relays described is as follows:

If no test piece is below the gauging pin of the comparator T the bottom contact thereof is closed so that the relay U receives current through said bottom contact and its operating contact $U_I$, if said operating contact $U_I$ has already been attracted by the relay U, which has here been assumed. Thus also operating contact $U_{II}$ is closed and the indicating lamp $L_1$ is lit. The relay V is not energized so that the lamp $L_3$ is not lit. The lamp $L_2$, too, is without current since the rest contact $U_{II}$ is open due to the energization of the relay U.

If a test piece with "undersize" is passed through the comparator nothing happens since the bottom contact of T is not able to open. The indicating lamp $L_1$ remains alight and thus indicates that the test piece is of "undersize."

If the dimension of the test piece is within the permissible limit set on the comparator the contact lever thereof moves into a position between the two stationary contact surfaces of said comparator when the test piece is passed through. Thus the current supply to the relay U is interrupted. Said relay is de-energized and its armature is released whereby its operating contacts $U_I$ and $U_{II}$ are opened, the latter causing the indicating lamp $L_1$ to be extinguished. By the de-energization of the relay U its rest contact $U_{II}$ is, however, closed, so that the indicating lamp $L_2$ is put into the circuit of the current source through it and through the rest contact $V_I$ already closed beforehand and lights up. On removal of the test piece out of the comparator the lower contact thereof is again closed, but this, however, does not cause any change in the current circuit since due to the operating contact $U_I$ of the relay $U$ now being open, said relay is not put into connection with the negative terminal of the current source. The indicating lamp $L_2$ which indicates the permissible tolerance position thus remains alight even if the test piece has long ago been removed from the comparator. The gauging result is thus retained and remains visible even after conclusion of the gauging operation.

By operating the switch $A$ at will in the direction of the arrow shown in Fig. 2 the operating contact $A_{II}$ is closed so that the current flow through the relay $U$ is again completed. As soon as the armature of said relay $U$ is attracted operating contact $U_I$ is closed, said operating contact $U_I$ connecting the relay winding through the bottom contact of the comparator $T$ now again closed to the negative terminal and thus maintains the energization of the relay $U$ even if the switch $A$ is again brought into its position of rest. When the relay $U$ is energized the lamp $L_2$ is immediately extinguished, whereas the lamp $L_1$ lights up. Thus the gauging result is cancelled and the initial starting condition prevails. The switch $A$ thus serves as a cancelling element.

If an "oversize" test piece is inserted in the comparator the indicating lamp $L_2$ lights up as described above if the contact lever of said comparator is between the two stationary contact surfaces. If, due to the thickness of the test piece, the top contact of the comparator is closed the winding of the relay $V$ is connected to the current source. When relay $V$ is energized the contact $V_I$ is opened which extinguishes the lamp $L_2$. By closing the operating contact $V_{II}$, however, the indicating lamp $L_3$ is connected to the current source and thus lights up and indicates the gauging result "oversize." If the test piece is now removed from the comparator the condition of the current circuit is maintained because the relay $V$, even after the opening of the top comparator surface, is fed with current through its own operating contact $V_{III}$, now closed, and through the rest contact $A_I$ of the cancelling element. Thus this gauging result, too, is retained after conclusion of the gauging operation until the current supply to the relay $V$ is interrupted by an arbitrary operation of the cancelling element $A$ and the current supply to the relay $U$ is initiated so that the initial condition of connection again prevails.

A special advantage of the circuit described lies in the fact that, besides retaining of the gauging result, the gauging automatically evaluates the external dimension such as the diameter of a shaft, without the operator having to seek the extreme points.

The alternative construction shown in Fig. 3 differs from that just described in so far as the cancelling element to be operated at will is replaced by a relay $W$ which automatically cancels the gauging result after the lapse of a certain time interval. For this purpose the relay $U$ is provided with a further operating contact $U_{III}$ which connects the winding of the cancelling relay $W$ in the excited condition, i. e. in the condition of rest of the arrangement, to the current source so that the change over contact of the relay $W$ is in the position shown in the condition of rest of the apparatus. Connected in parallel with the winding of the relay $W$ there is a capacitor $C_1$ and a resistance formed of two partial resistances $R_1$ and $R_2$, the partial resistance $R_2$ being adjustable. The rest of the wiring is the same as in Fig. 2 and similarly the indicating and retaining of the various gauging results therefore takes place in the manner already described. The cancelling of a gauging result, however, takes place as follows:

On inserting a test piece not being "undersize" in the comparator $T$, as already mentioned in the preceding example, the relay $U$ was de-energized by the opening of the bottom contact of the comparator. At the same time the operating contact $U_{III}$ was also opened so that the current supply to the cancelling relay $W$ is now interrupted. The capacitor $C_1$ was previously charged to the voltage of the current source so that said capacitor serves as a feeding supply for the winding of the relay $W$ after the contact $U_{III}$ has been opened. In this condition said capacitor discharges partly through the winding of the relay and partly through the two resistances $R_1$ and $R_2$ and as soon as the voltage of the capacitor drops below the release voltage of the relay $W$ its armature is released, causing an opening of the operating contact $W_I$ and a closing of the rest contact $W_{II}$, i. e. exactly the same as if if the cancelling key $A$ is operated in the arrangement shown in Fig. 2. The current supply to the relay $V$ is thus interrupted and that to the relay $U$ is initiated so that the switching arrangement is again brought into its condition of rest. As soon as on response of the relay $U$ its contact $U_{III}$ is closed the cancelling relay again responds and the capacitor $C_1$ is again charged. By altering the partial resistance $R_2$ the discharging time of the capacitor can be changed, thus allowing the time interval from the start of the gauging operation to the cancelling of the gauging result to be adjusted within wide limits.

A further alternate of circuit is shown in Fig. 4. It differs mainly from that shown in Fig. 2 by a different type of switch $A$ and by a different wiring of the contact elements of the comparator $T$. The bottom contact surface of the comparator is connected directly with the corresponding end of the relay $U$ instead of through the operating contact $U_I$, whereas the same end of the winding is now connected to the negative terminal of the current supply through the operating contact $U_I$ and a further rest contact $A_{II}$. The contact lever of the comparator $T$ is in connection with the operating contact $A_I$ of the switch $A$ which is bridged by a capacitor $C_2$ to the negative terminal.

In the condition of rest the contacts are in the position shown, i. e. the relay $U$ is excited and the relay $V$ is deenergized as in the examples already described, but with the difference that the relay $U$ now takes its holding current through its operating contact $U_I$ and through the rest contact $A_{II}$.

On inserting a test piece with "undersize" again no alteration of the current circuit takes place and the lamp $L_1$ meaning "undersize" already alight remains alight.

However, if by way of example a test piece is inserted the dimensions of which are within the permissible limits, the lower contact of the comparator is opened. Contrary to the circuit shown in Figs. 2 and 3 the relay $U$ remains energized. If the switch $A$ is now operated in the direction of the arrow shown while the test piece is still under the gauging pin of the comparator $T$ the rest contact $A_{II}$ is opened and interrupts the current supply to the relay $U$ so that it is released and extinguishes the indicating lamp $L_1$ by means of its contact $U_{II}$ and causes the lamp $L_2$ to become alight which indicates the permissible tolerance position. On returning the switch $A$ into its position of rest its contact $A_{II}$ is again closed, but since the operating contact $U_I$ is now open, the relay $U$ can nevertheless not come into action again, not even if the test piece is now removed from the comparator $T$. The gauging result is thus again retained after the conclusion of the gauging operation according to the invention, but it does not become automatically visible during the gauging, but only after operation of the switch $A$ which trips the gauging result. In this case the switch can appropriately be called a tripping element. With advantage said switch is a key to be operated at will either by hand or by foot.

If by way of example a test piece with "undersize" is now inserted in the comparator T the bottom contact of the comparator remains closed and for the present nothing happens. By operating the tripping element A, however, the operating contact $A_I$ is closed, having the effect that the capacitor $C_2$ is discharged by short-circuiting and that simultaneously the relay U is put into action through the bottom contact of the comparator now closed. Thereby the lamp $L_2$ is extinguished and the lamp $L_1$ is lighted which condition now shows the correct gauging result. On the switch A being returned into its position of rest, if the operating contact $A_I$ is first of all opened before the rest contact $A_{II}$ is closed, the relay U would have time to drop if it were not for the capacitor $C_2$. Because said capacitor was previously discharged a charging current is now set up through the winding of the relay U which is sufficient to keep the relay in action during the changing-over time of the switch A. In the position of rest of said switch the current supply to the relay U again takes place through the rest contact $A_{II}$. This new condition of connections now again remains in existence.

If a test piece with "oversize" is inserted in the comparator, the bottom contact of said comparator is opened whereas the top one is closed. The relay U still receives its current through the operating contact $U_I$ and the rest contact $A_{II}$, and the relay V cannot receive any current because of the open operating contact $A_I$ and the charged capacitor $C_2$ so that no change in the indicated lamp current circuit takes place. Only on operation of the tripping element A the relay U becomes deenergized and the relay V excited so that the lamp $L_1$ becomes extinct and the lamp $L_3$ corresponding to the "oversize" is set alight. On the tripping element returning into its position of rest the operating contact $A_I$ is first of all opened, but since as has already been described a charging current now flows through the capacitor $C_2$, which charging current flows through the winding of the relay V due to the top contact of the comparator still being closed, said relay V remaining in action until the current flow takes place through its closed operating contact $V_{III}$ and through the rest contact $A_I$ of the tripping element. After removal of the test piece out of the comparator this condition of connections remains in existence.

The release element A can also be used simultaneously as a cancelling element in order to cancel the gauging result at any moment desired after conclusion of the gauging operation since it comes to the same whether no test piece is in the comparator or whether there is one with "oversize" for which case the method of operation of the element A has already been described.

In Fig. 5 there is shown a further embodiment of circuits and apparatus according to the present invention. It differs mainly from that shown in Fig. 4 by being provided with three further relays X, Y and Z as well as a further operating contact $A_{II}$ and a further rest contact $A_{III}$ on the tripping element A. The contact lever of the comparator T is in connection with the negative terminal of the current source. The bottom contact of the comparator is connected through an operating contact $X_I$ of the relay X with one end of the winding of said relay X as well as with an operating contact $Z_I$ of the relay Z. The top contact of the comparator is connected with one end of the winding of the relay Y as well as with an operating contact $Y_I$ of said relay Y. The other ends of these two relay windings are connected to the positive terminal of the current source whereas the winding of the relay Z is connected with one of its ends through the capacitor $C_3$ to the positive terminal of the current supply. The other end of the relay Z is in connection with the negative terminal through the rest contact $A_{III}$ of the tripping element A and can be connected to the negative terminal through the operating contact $A_{II}$ by operating said tripping element A. A rectifier G bridges the winding of the relay Z in one current direction. A resistance $R_3$ in series with a capacitor $C_2$ is inserted between the negative terminal of the current source and the operating contact $X_{II}$ of the relay X, said operating contact $X_{II}$ in its turn being connected to the end of the winding of the relay U connected to its operating contact $U_I$. The combination of resistance and capacitor $R_3$, $C_2$ can be short-circuited by means of the operating contact $A_I$ of the tripping element A.

The purpose and method of operation of this wiring arrangement is as follows:

In the condition of rest all switching contacts are in the position shown in Fig. 5, i. e. the relays U and X are excited so that the indicating lamp $L_1$ is alight whereas the remaining relays are deenergized. If by way of example a test piece, the dimension of which is within the permissible limits, is now inserted in the comparator T, the contact lever of said comparator moves to a position between the bottom and the top stationary contact surface. Thus the bottom and the top gauging contacts are open. The relay X thereby becomes deenergized so that its operating contacts $X_I$ and $X_{II}$ are opened. Since these contacts, however, are only connected with the current circuits interrupted at this moment the condition of the remaining current circuits remains unchanged. If the test piece is now again removed from the comparator the lower gauging contact closes. But because the relay X was previously excited and its operating contact $X_I$ is now open no alteration of the prevailing condition takes place. Only by the operation of the tripping element A in the direction of the arrow shown the rest contact $A_{II}$ interrupts the current flow through the relay U so that its armature is released and its operating contacts $U_I$ and $U_{II}$ are opened and the rest contact $U_{II}$ is closed which has the effect that the lamp $L_1$ becomes extinct and the lamp $L_2$ is set alight, the latter only now indicating the permissible tolerance position long after the test piece has again been removed from the comparator. On operating the tripping element A its operating contacts $A_I$ and $A_{II}$ are also closed. As the relay X had dropped previously and its contact $X_{II}$ is open the closing of $A_I$ has no influence on the current circuit. The contact $A_{II}$, however, enables the charging of the capacitor $C_3$ through the rectifier G, the rectifier for the charging current thereby short-circuiting the winding of the relay Z so that said relay Z is not excited. On return of the tripping element into its position of rest the opening of the operating contacts $A_I$ and $A_{II}$ has no influence on the switching condition of the remaining elements nor likewise the closing of the rest contacts $A_I$ and $A_{II}$. The rest contact $A_{III}$, however, closes a discharging current circuit for the capacitor $C_3$. The discharging current now flows through the winding of the relay Z since due to the opposite current direction no current can flow through the rectifier G. The relay Z therefore comes into action and closes its operating contact $Z_I$ which connects the relay X to the current source, said relay X remaining in action by the closing of its own operating contact $X_I$ as the bottom gauging contact is closed since the test piece has been removed. The other operating contact $X_{II}$ of the relay X does not cause any change of condition except a slow charging of the capacitor $C_2$, the charging current of which is kept so low by the resistance $R_3$ that it is not sufficient to bring the relay U into action. After the capacitor $C_2$ has been discharged the relay Z again becomes de-energized without having any influence on the rest of the switching condition. The gauging result is still retained.

If a further test piece being by way of example of "oversize" is now inserted in the comparator the bottom gauging contact is first of all opened which has the effect that the relay X becomes de-energized, but causes no further alteration in the switching condition. Because the test piece is of "oversize" the top gauging contact is closed which puts the relay Y into action. Its operating contact $Y_I$ closes a holding current circuit for its own relay which therefore remains in action even after the test piece has been removed from the comparator. Its other operating contact $Y_{II}$ closes a charging current circuit for the capacitor $C_2$, said charging current circuit leading from the positive terminal through the winding of the relay V, the operating contact $Y_{II}$, the capacitor $C_2$ and the resistance $R_3$ to the negative terminal. The resistance $R_3$ reduces the charging current to such a degree that the relay V cannot become excited thereby so that no further change of condition occurs. The closing of the bottom gauging contact caused by the removal of the test piece likewise has no influence on the switching condition, since the relay X has dropped. Even now after the second test piece has been inserted and again removed from the comparator the indicating lamp $L_2$ corresponding to the previous gauging operation is still alight. On operating the tripping key A a charging of the capacitor $C_3$ again takes place due to the closing of the operating contact $A_{II}$, as in the case of the permissible tolerance test previously described and by the closing of the operating contact $A_I$ a current circuit is formed through the closed operating contact $Y_{II}$ and the winding of the relay V, said relay V on coming into action interrupts the current supply to the indicating lamp $L_2$ by means of its rest contact $V_I$ and sets the lamp $L_3$ alight by means of the operating contact $V_{II}$, said indicating lamp now making the gauging result of the last gauging operation visible. At the same time the operating contact $A_I$ of the tripping element A has discharged the capacitor $C_2$. If the tripping element returns to its position of rest a charging current flows through the winding of the relay V, the operating contact $V_{III}$ and the operating contact $Y_{II}$ to the capacitor $C_2$, said current in spite of its being limited by the resistance $R_3$ being large enough to prevent the relay V from becoming de-energized until the rest contact $A_I$ has closed and the current supply to the relay V takes place through its operating contact $V_{III}$. Simultaneously the operating contact $A_{II}$ has been opened and the rest contact $A_{III}$ been closed, said closed rest contact $A_{III}$ causing the discharging of the capacitor $C_3$ through the winding of the relay Z as was the case in the previous permissible tolerance test. The discharging current excites the relay Z the rest contact $Z_I$ of which interrupts the current supply to the relay Y since the top gauging contact is open. The operating contact $Y_{II}$ can, however, not interrupt the current flow through the relay V since said current flow is kept going through its contact $V_{III}$. By the closing of the operating contact $Z_I$ on the relay Z coming into action the relay X is excited, said relay X afterwards keeping itself in action through its operating contact $X_I$ and the closed bottom gauging contact, even if after the discharging of the capacitor $C_3$ the relay Z drops. The opening of the operating contact $Z_I$ and the closing of the rest contact $Z_I$ has no influence on the remaining switching elements so that the previous gauging result is still retained and remains visible by the lamp $L_3$ remaining alight.

If a test piece of "undersize" is now inserted in the comparator the top and the bottom gauging contact do not change their position. If, however, the tripping key is operated its rest contact $A_I$ interrupts the current flow through the relay V so that said relay drops and its operating contacts $V_{II}$ and $V_{III}$ are opened. This causes the indicating lamp $L_3$ to become extinct, whereas in the first instance lamp $L_2$ is set alight through the rest contact $V_I$, until by the closing of the operating contact $A_I$, the relay U is supplied with current through the closed operating contact $X_{II}$ whereby the lamp $L_2$ is extinguished by its contact $U_{II}$ and whereby the lamp $L_1$ is switched in, which condition indicates the gauging result "undersize." By the closing of the operating contact $A_I$ of the tripping element the capacitor $C_2$ is simultaneously discharged through the resistance $R_3$ so that on return of the tripping element into its position of rest a new charging current flows through the relay U and the closed operating contact $X_{II}$ to the capacitor $C_2$. This charging current is able to hold the relay U previously already put into action until the rest contact $A_{II}$ of the tripping element is closed. On closing the rest contact $A_{III}$ the discharging of the capacitor $C_3$ through the relay Z takes place, the coming into action of said relay Z, however, causing no alteration of the rest of the switching elements.

As is evident from the above the tripping element A can simultaneously serve as cancelling element in order to cancel at will a gauging result retained.

All the wiring arrangements illustrated and described by way of example can appropriately be combined by using suitable change over switches in such a manner that with one and the same arrangement the one or the other of the gauging methods described can be carried out at will. In Fig. 6 such an apparatus is shown by way of example, said apparatus having a housing 12 on the front side of which the indicating lamps $L_1$, $L_2$ and $L_3$ corresponding to the limit groups "undersize," "permissible tolerance" and "oversize" are arranged. In Fig. 7 the rear panel of this apparatus is shown, said rear panel having a plug receptacle 13 for the comparator, a change over switch 14 and a second change over switch 15 as well as a time switch 16. By means of the two change over switches 14 and 15 it is possible to select one of the wiring arrangements described heretofore whereas the time interval after which a cancelling or tripping of the gauging result is to take place can be set by the time switch 16. The cancelling and tripping element, respectively, can be connected to a receptacle sleeve by a cable (not shown).

For the gauging of certain work pieces it becomes necessary to use several comparators simultaneously which are set correspondingly to the permissible limits of the various dimensions of the work piece in order to achieve efficient operation. For each comparator an apparatus according to the invention is required to make the gauging results visible.

Various changes and modifications may be made without departing from the spirit and scope of the present invention and it is intended that such obvious changes and modifications be embraced by the annexed claim.

What I claim and wish to secure by Letters Patent is:

In an apparatus for measuring work pieces including a comparator adapted to engage a work piece for gauging whether the latter is within a predetermined size range, said comparator including first and second contacts, movable means selectively engageable with said first and second contacts, respectively, upon gauging of respective work pieces having undersize or oversize, first indicating means, second indicating means, first electroresponsive means connecting said first contact to said first indicating means, and second electroresponsive means connecting said second contact to said second indicating means, said first and second electroresponsive means operating said first and second indicating means, respectively, for recording and retaining the results of gauging after removal of the respective work pieces from said comparator; the improvement which comprises means cancelling the respective recorded result of gauging, said cancelling means including first and second cancelling contacts connected to said first and second electroresponsive means, respectively, and a tripping switch normally cooperating with said second cancelling contact and selectively cooperable with said first cancelling contact, whereby upon displacement of said tripping switch from said second cancelling contact to said first cancelling contact said first electroresponsive means is energized to return both said indicating means to initial condition.

(References on following page)

References Cited in the file of this patent

UNITED STATES PATENTS

| | | |
|---|---|---|
| 407,903 | Schlatter | July 30, 1889 |
| 2,382,885 | Landay et al. | Aug. 14, 1945 |
| 2,399,305 | Agnew | Apr. 30, 1946 |
| 2,431,099 | Wiseman | Nov. 18, 1947 |
| 2,433,585 | Warner | Dec. 30, 1947 |
| 2,503,851 | Snow | Apr. 11, 1950 |
| 2,584,714 | Kirkpatrick | Feb. 5, 1952 |

FOREIGN PATENTS

| | | |
|---|---|---|
| 594,395 | Great Britain | Nov. 11, 1947 |